United States Patent [19]

Meininger

[11] Patent Number: 5,015,732

[45] Date of Patent: May 14, 1991

[54] WATER SOLUBLE COPPER-COMPLEX PHENYLAZONAPHTHYL AND NAPHTHYLAZONAPHTHYL COMPOUNDS CONTAINING AS FIBRE-REACTIVE GROUPS A CHLORO-TRIAZINYL GROUP AND A GROUP OF THE VINYLSULFONE SERIES, SUITABLE AS DYESTUFFS

[75] Inventor: Fritz Meininger, Frankfurt am Main, Fed. Rep. of Germany

[73] Assignee: Hoechst Aktiengesellschaft, Frankfurt, Fed. Rep. of Germany

[21] Appl. No.: 180,708

[22] Filed: Mar. 29, 1988

Related U.S. Application Data

[63] Continuation of Ser. No. 73,841, Jul. 15, 1987, abandoned, which is a continuation of Ser. No. 570,433, Jan. 13, 1984, abandoned, which is a continuation of Ser. No. 395,645, Jul. 6, 1982, abandoned.

[30] Foreign Application Priority Data

Jul. 7, 1981 [DE] Fed. Rep. of Germany ....... 3126909

[51] Int. Cl.$^5$ .................. C09B 62/095; C09B 62/515; D06P 1/382; D06P 1/384
[52] U.S. Cl. .................................... 534/622; 534/617; 534/629; 534/642
[58] Field of Search ................ 534/617, 622, 629, 642

[56] References Cited

U.S. PATENT DOCUMENTS

| | | | |
|---|---|---|---|
| 3,223,470 | 12/1965 | Boedeker et al. | 534/622 X |
| 4,341,699 | 7/1982 | Tezuka et al. | 534/638 X |
| 4,378,318 | 3/1983 | Kayane et al. | 534/638 X |

*Primary Examiner*—Floyd D. Higel
*Attorney, Agent, or Firm*—Curtis, Morris & Safford

[57] ABSTRACT

Water-soluble copper complex monoazo compounds of the general formula (1)

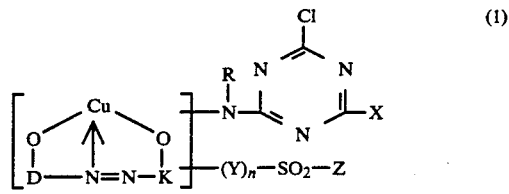

in which D denotes the radical of a diazo component of the benzene or naphthalene series with the oxy group in the ortho-position relative to the azo bridge, K denotes the radical of a coupling component of the benzene, naphthalene, pyridone or pyrazolone series with the phenolic or enolic oxy group in ortho-position relative to the azo group, R denotes hydrogen or alkyl of 1 to 4 C atoms, Y denotes the radical of the formula —NH—, —N(lower alkyl)— or —CH$_2$—, n represents the number zero or 1, Z denotes the vinyl, $\beta$-acetoxyethyl, $\beta$-thiosulfatoethyl, $\beta$-chloroethyl or $\beta$-sulfatoethyl group and X denotes a radical of the general formula (2a), (2b) or (2c)

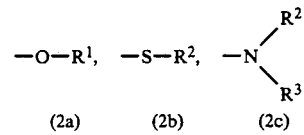

in which R$^1$ is an optionally substituted alkyl radical, an optionally substituted aryl radical or an optionally substituted heteroaromatic radical, R$^2$ is a hydrogen or an optionally substituted alkyl radical or a cycloaliphatic radical and R$^3$ is a hydrogen atom or an optionally substituted alkyl radical or an optionally substituted aryl radical, or R$^2$ and R$^3$, together with the nitrogen atom, form a heterocyclic saturated ring which may contain a further hetero atom, and in which the groups of the formulae (3) and (4)

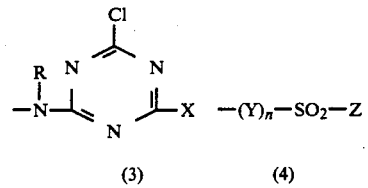

in which R, X, Y, Z and n have the abovementioned meaning, are bonded to the radical D and the radical K, either separately from one another or simultaneously to D or K. The new compounds have valuable fiber-reactive dyestuff properties and dye, for example, cellulose fiber materials and polyamide fiber materials, in fast, deep shades.

8 Claims, No Drawings

WATER SOLUBLE COPPER-COMPLEX PHENYLAZONAPHTHYL AND NAPHTHYLAZONAPHTHYL COMPOUNDS CONTAINING AS FIBRE-REACTIVE GROUPS A CHLORO-TRIAZINYL GROUP AND A GROUP OF THE VINYLSULFONE SERIES, SUITABLE AS DYESTUFFS

This application is a continuation of application Ser. No. 073,841 filed July 15, 1987, now abandoned; which was a continuation of application Ser. No. 570,433 filed Jan. 13, 1984, now abandoned, which was a continuation of application Ser. No. 395,645 filed July 6, 1982 now abandoned.

The invention relates to the industrial field of fiber-reactive copper complex monoazo dyestuffs.

The present invention provides new water-soluble copper complex monoazo compounds of the general formula (1)

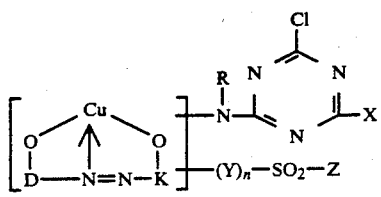

in which D denotes the radical of a diazo component of the benzene or naphthalene series whose metal-complexing hydroxy group, respectively oxy group, is in the ortho-position relative to the azo bridge, K is the radical of a coupling component of the benzene, naphthalene, pyridone or pyrazolone series and having a phenolic or enolic hydroxy group which complexes the copper, and to which coupling component the azo group has been coupled in the ortho-position relative to, or adjacent to, this phenolic or enolic hydroxy group, respectively oxy group, R is a hydrogen atom or an alkyl group of 1 to 4 C atoms, Y denotes the bivalent radical of an amino group or of a lower alkylamino group or the methylene group, n represents the number zero or 1, Z denotes the vinyl, the $\beta$-acetoxyethyl, a $\beta$-thiosulfatoethyl, the $\beta$-chloroethyl or, preferably, a $\beta$-sulfatoethyl group and X represents a radical of the general formula (2a), (2a) or (2c)

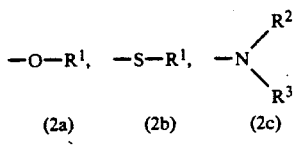

in which $R^1$ denotes an optionally substituted, branched or unbranched alkyl radical, an optionally substituted aryl radical or an optionally substituted heteroaromatic radical, $R^2$ is a hydrogen or an optionally substituted, branched or unbranched alkyl radical or a cycloaliphatic radical and $R^3$ denotes a hydrogen atom or an optionally substituted, branched or unbranched alkyl radical or an optionally substituted aryl radical, where $R^2$ and $R^3$ can be identical or different or where $R^2$ and $R^3$, together with the nitrogen atom, form a heterocyclic, saturated ring which may contain a further hetero atom, such as a nitrogen or oxygen atom.

Groups of the formulae (3) and (4)

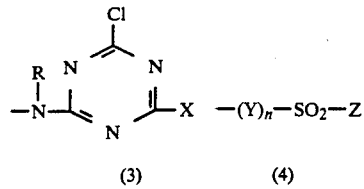

which are present in the general formula (1) and in which R, X, Y, Z and n have the abovementioned meaning are bonded to the radical D and to the radical K, either separately from one another or simultaneously to D or K. Of these compounds those copper complex monoazo compounds of the general formula (1) and according to the invention are preferably which contain the chlorotriazinylamino radical of the general formula (3) bonded to the radical of the coupling component K, and the radical of the general formula (4) bonded to the radical of the diazo component D.

The radicals D and K can contain substituents which are customary in the case of water-soluble azo dyestuffs, thus, for example, in particular, alkoxy groups of 1 to 4 C atoms, such as the methoxy, ethoxy, propoxy, isopropoxy and butoxy group, alkyl groups of 1 to 4 C atoms, such as, in particular, the methyl and ethyl group, halogen atoms, such as fluorine, chlorine and bromine atoms, the hydroxy group, the carboxy group, the nitro group, lower alkyl groups which can be substituted, such as, for example, by a hydroxy sulfato, sulfo, carboxy or a lower alkoxy group, acylamino groups of aliphatic carboxylic acids of 2 to 6 C atoms or of aromatic carboxylic acids, such as benzoic acid, thus, in particular, acetylamino, propionylamino and benzoylamino groups, sulfonic acid groups, sulfamoyl and carbamoyl groups, either of which can be monosubstituted or disubstituted at the nitrogen atom by lower alkyl, optionally substituted benzyl or optionally substituted phenyl groups, and the cyano group. The formula radical K can also contain, as substituents, amino, lower alkylamino, aminophenyl and lower aminoalkyl radicals.

The compounds according to the invention can be in the form of their free acid but also, preferably, in the form of their salts, in particular neutral salts. Salts to be mentioned in particular are the alkali metal and alkaline earth metal salts, thus, for example, the sodium, potassium and calcium salts. The new compounds are preferably used in the form of these salts for dyeing fiber materials.

The term "lower" denotes here as in the text below that the alkyl or alkylene radical or alkenyl radical contained in the group thus designated comprises 1 to 6 or 2 to 6 C atoms respectively, preferably 1 to 4 or 2 to 4 C atoms respectively.

The optionally substituted alkyl radicals mentioned for the formula radicals $R^1$, $R^2$ and $R^3$ are preferably lower alkyl radicals which can be unsubstituted or substituted. Examples of substituted lower alkyl radicals are branched or unbranched alkyl groups of 1 to 4 C atoms and which are substituted by 1 or 2 substituents from the group comprising acetylamino, hydroxy, sulfato, $\beta$-sulfatoethylsulfonyl, $\beta$-thiosulfatoethylsulfonyl, lower alkoxy, sulfo, carboxy, phenyl, naphthyl, phenyl which is substituted by sulfo, carboxy, $\beta$-sulfatoethylsulfonyl, $\beta$-thiosulfatoethylsulfonyl, methyl, ethyl, methoxy, ethoxy, chlorine, sulfomethyl, ureido, sulfamoyl and/or carbomoyl, and naphthyl which is substituted by sulfo, carboxy, β-sulfatoethylsulfonyl, β-thiosulfatoethylsulfonyl, sulfomethyl, ureido, acetylamino, sulfamoyl and/or carbamoyl. A cycloaliphatic radical is preferably a cyclopentyl, or in particular cyclohexyl, radical, which can be substituted by 1, 2 or 3 methyl groups. Aryl radicals are preferably the phenyl or naphthyl radicals, which can be substituted or unsubstituted, for example by substituents from the group comprising carboxy, sulfo, lower alkyl, lower alkoxy, hydroxy, chlorine, bromine, sulfomethyl, acetylamino, benzoylamino, β-sulfatoethylsulfonyl, carbomoyl, sulfamoyl, ureido, amino and lower alkylamino. Examples of aromatic heterocyclic radicals are the benzothiazolyl radical, which can be substituted in the carbocyclic nucleus by methyl, methoxy, ethoxy, sulfo and/or sulfamoyl.

Examples of heterocyclic radicals which the formula moieties $R^2$ and $R^3$ can form together with the nitrogen atom are the morpholino, piperidino and piperazino radical.

Examples of optionally substituted alkyl groups represented by the formula radical $R^1$ are the methyl, ethyl, propyl, isopropyl, methoxymethyl or methoxyethyl and ethoxyethyl group. Examples of optionally substituted aryl radicals which can be used as $R^1$ are the phenyl, 4-chlorophenyl and 4-methoxyphenyl radicals.

The following groups may be mentioned as examples of the amino radical of the general formula (2c): amino, methylamino, ethylamino, propylamino, isopropylamino, butylamino, β-methoxyethylamino, dimethylamino, diethylamino, benzylamino, β-chloroethylamino, β-hydroxyethylamino, cyclohexylamino, morpholino, piperidino, piperazino and in particular aryl-substituted amino groups, such as phenylamino, N-methyl-N-phenylamino, toluidino, xylidino, chloroanilino, anisidino, phenetidino, sulfoanilino, 3-(β-sulfatoethylsulfonyl)-anilino, disulfoanilino, sulfomethylanilino, N-sulfomethylanilino, carboxyphenylamino, 2-carboxy-5- or -4-sulfophenylamino and sulfonaphthylamino, such as, for example, 4-sulfonaphth-1-ylamino, 3,6-disulfonaphth-1-ylamino or 3,6,8-trisulfonaphth-1-ylamino.

The present invention also relates to a process for preparing compounds of the general formula (1). The new copper complex monoazo compounds can be synthesized according to the invention by reacting a copper complex monoazo compound of the general formula (5)

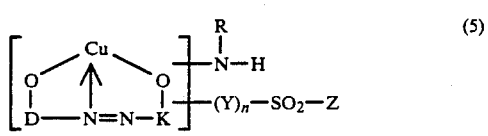

in which D, K, R, Y, Z and n have the abovementioned meanings and in which the groups of the general formula (4) and of the general formula —NHR are bonded separately or simultaneously to D and K, in an equimolar amount with the 2,4-dichloro-s-triazine compound of the general formula (6)

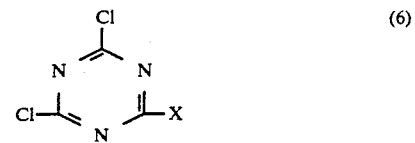

in which X has the abovementioned meaning, or by preferably reacting a copper complex monoazo compound of the general formula (5) in an equimolar amount with 2,4,6-trichloro-s-triazine and condensing the resulting dichlorotriazinylamino compound of the general formula (7)

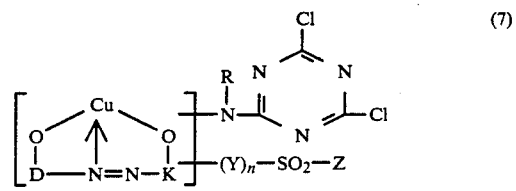

in which D, K, R, Y, Z and n have the abovementioned meanings, —its radicals corresponding to the abovementioned general formula (4) and to the following general formula (9)

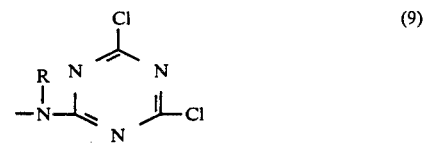

in which R has the abovementioned meaning are bonded to D and K, separately from one another or simultaneously to D or K, —in an equimolar amount with an amine of the general formula (8)

in which $R^2$ and $R^3$ have the abovementioned meanings.

Compounds of the general formula (1) can also be prepared according to the invention by converting a compound of the general formula (10)

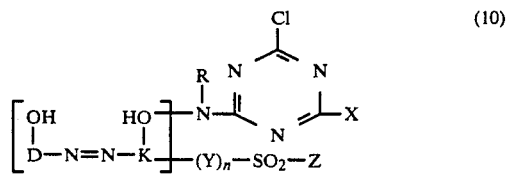

in which D, K, R, X, Y, Z and n have the abovementioned meanings and in which the radicals corresponding to the general formulae (3) and (4) are bonded to D and K, separately from one another or simultaneously to D or K, with a copper-donating agent in a way which is in itself known into the copper complex compound. Examples of copper-donating agents are the salts of copper, such as copper sulfate, copper chloride and copper acetate.

The reaction of the copper complex monoazo compounds of the general formula (5) or of the general formula (7) with cyanuric chloride or with an amine of the general formula (8) is as a rule carried out in an aqueous medium, if desired with the additional use of an organic solvent, at a temperature between 0° C. and 50° C., preferably between 10° and 30° C., and a pH value between 4 and 7, preferably between 5.5 and 6.8. Hydrochloric acid evolved in the condensation reactions is bound by means of an acid-binding agent, such as, for example, sodium hydroxide, potassium hydroxide, preferably sodium carbonate or potassium carbonate, sodium bicarbonate, potassium bicarbonate, sodium acetate or a basic sodium phosphate.

The synthesis of the copper complex monoazo compound of the general formula (5), which is used as a starting compound, can be carried out in a manner which is in itself known, thus, for example, by converting a monoazo compound of the general formula (11)

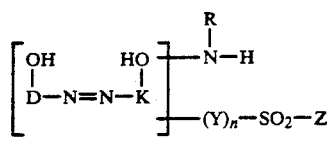

in which D, K, R, Y, Z and n have the abovementioned meanings and in which the radicals of the general formulae (4) and —NHR are bonded to D and K, separately from one another or simultaneously to D or K, with a copper-donating agent into the compound of the general formula (5), or by converting a monoazo compound of the general formula (12)

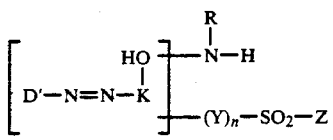

in which D' denotes the radical of a diazo component of the benzene or naphthalene series and having a hydrogen atom in the ortho-position relative to the azo group and R, Y, Z and n have the abovementioned meanings and in which the radicals of the general formulae (4) and —NHR are bonded to D' and K, separately from on another or simultaneously to D' or K, with a copper-donating agent in the presence of an oxidizing agent into compounds of the general formula (5), or by subjecting a monoazo compound of the general formula (13)

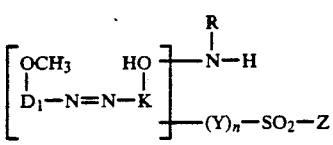

in which D₁ denotes the radical of a diazo component of the benzene or naphthalene series and having the methoxy group in the ortho-position relative to the azo bridge and R, Y, Z and n have the abovementioned meanings and in which the radicals of the general formulae (4) and —NHR are bonded to D₁ and K, separately from one another or simultaneously to D₁ or K, to a dealkylating coppering reaction.

The starting compounds of the general formula (5) can also be prepared by first converting a monoazo compound of the general formula (14)

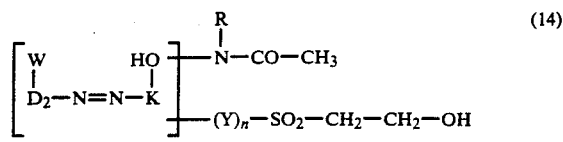

in which $D_2$ denotes the radical of a diazo component of the benzene or naphthalene series, in which radical the formula radical W is bonded in the ortho-position to the azo group and denotes a hydrogen atom or the hydroxy or methoxy group, and K, R, Y and n have the abovementioned meanings and in which the acetylamino and β-hydroxyethylsulfonyl radicals indicated in the formula (14) are bonded to $D_2$ and K, separately from one another or simultaneously to $D_2$ or K, in a way which is in itself known, as above for the starting compounds of the general formulae (11), (12) and (13), by simple coppering or by oxidative coppering or by dealkylating coppering into the copper complex compounds of the general formula (15)

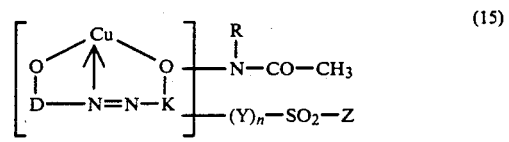

in which D, K, R, Y, Z and n have the meanings mentioned and the acetylamino and β-hydroxyethylsulfonyl radicals are bonded to D and K, separately from one another or simultaneously to D or K; the compounds of the general formula (15) and having the β-hydroxyethylsulfonyl group can then be converted analogously to procedures which are in themselves known by hydrolysis of the acetylamino group and sulfation (esterification) of this hydroxy group in the β-hydroxyethylsulfonyl group into compounds of the general formula (5) in which, here, Z represents the β-sulfatoethyl radical.

The starting compounds of the general formula (10) can be prepared in a way which is in itself known by diazotizing the corresponding aminophenol which is being used as a diazo component and which contains, or can contain, the radical of the general formulae (3) or (4), or both, and coupling the diazonium compound with the corresponding coupling component which contains, or can contain, the radical of the general formulae (3) or (4), or both, these two components being of course chosen in such a way that they, together, possess one radical of the formula (3) and one radical of the formula (4).

Examples of aromatic amines which can be used as diazo components for preparing the monoazo compounds of the general formulae (11) to (14), which are used as starting compounds, are 4-aminophenyl-β-hydroxyethyl sulfone, 4-aminophenyl-β-sulfatoethyl sulfone, 3-aminophenyl-β-hydroxyethyl sulfone, 3-aminophenyl-β-sulfatoethyl sulfone, 3-amino-4-hydroxyphenyl-β-hydroxyethyl sulfone, 3-amino-4-hydroxyphenyl-β-sulfatoethyl sulfone, 3-amino-4-hydroxyphenyl-β-thiosulfatoethyl sulfone, 3-amino-4-hydroxyphenylvinyl sulfone, 3-amino-4-hydroxyphenyl-β-acetoxyethyl sulfone, 3-amino-4-hydroxyphenyl-β-chloroethyl sulfone, 4-amino-5-hydroxyphenyl-β- hydroxyethyl sulfone, 4-amino-5-hydroxyphenyl-β-sulfatoethyl sulfone, 4-amino-5-hydroxyphenylvinyl sulfone, 4-aminobenzyl-β-hydroxyethyl sulfone, 3-aminobenzyl-β-sulfatoethyl sulfone, 4-amino-N-(β-sulfatoethylsulfonyl)-aminobenzene, 4-amino-N-methyl-N-(β-sulfatoethylsulfonyl)-aminobenzene, 4-amino-N-ethyl-N-(β-sulfatoethylsulfonyl)-aminobenzene, 3-amino-4-methoxyphenyl-β-hydroxyethyl sulfone, 3-amino-4-methoxyphenyl-β-sulfatoethyl sulfone, 4-amino-2,5-dimethoxyphenyl-β-sulfatoethyl sulfone, 4-amino-2-methyl-5-methoxyphenyl-β-sulfatoeyhyl sulfone, 3-amino-4-hydroxy-5-nitrophenyl-β-sulfatoethyl sulfone, 3-amino-4-hydroxy-5-sulfophenyl-β-sulfatoethyl sulfone, 3-amino-4-hydroxy-5-chlorophenyl-β-sulfatoethyl sulfone, 7-amino-3-sulfonaphth-1-yl-β-sulfatoethyl sulfone, 7-aminonaphth-1-yl-β-hydroxyethyl sulfone, 6-aminonaphth-2-yl-β-sulfatoethyl sulfone, 4-aminonaphth-1-yl-β-sulfatoethyl sulfone, 6-aminonaphth-1-yl-β-sulfatoethyl sulfone, 5-aminonaphth-2-yl-β-sulfatoethyl sulfone, 8-aminonaphth-2-yl-β-sulfatoethyl sulfone, 2-amino-6-acetylaminophenol-4-sulfonic acid, 2-amino-4-acetylaminophenol-6-sulfonic acid, 2-amino-4-acetylaminophenol, 2-amino-4-chloro-6-acetylaminophenol and 1-amino-6-acetylamino-2-hydroxynaphthalene-4-sulfonic acid.

Examples of compounds having a phenolic or enolic hydroxy group and which can be used as coupling components for preparing the azo compounds of the general formulae (11) to (14), which serve as starting compounds, are 1-amino-8-hydroxynaphthalene-3,6-disulfonic acid, 1-acetylamino-8-hydroxynaphthalene-3,6-disulfonic acid, 1-amino-8-hydroxynaphthalene-4,6-disulfonic acid, 1-acetylamino-8-hydroxynaphthalene-4,6-disulfonic acid, 2-amino-5-hydroxynaphthalene-7-sulfonic acid, 2-methylamino-5-hydroxynaphthalene-7-sulfonic acid, 2-butylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-amino-3-hydroxynaphthalene-6-sulfonic acid, 2-amino-3-hydroxynaphthalene-6,7-disulfonic acid, 1-(2'-methyl-3'-amino-5'-sulfophenyl)-3-methylpyrazol-5-one, 1-(2'-sulfo-4'-aminophenyl)-3-methylpyrazol-5-one, 1-(2'-methyl-3'-amino-5'-sulfophenyl)-3-carboxypyrazol-5-one, 1-(3'-or 4'-aminophenyl)-3-carboxypyrazol-5-one, 1-(3'- or 4'-aminophenyl)-3-methylpyrazol-5-one, 1-(2'-sulfo-4'-aminophenyl)-3-carbethoxypyrazol-5-one, 1-hydroxynaphth-4-yl-β-sulfatoethyl sulfone, 1-hydroxynaphth-5-yl-β-sulfatoethyl sulfone, 2-[N-methyl-N-(β-sulfatoethylsulfonyl)amino]-8-hydroxynaphthalene-6-sulfonic acid, 2-[N-methyl-N-(β-sulfatoethylsulfonyl)-amino]-5-hydroxynaphthalene-7-sulfonic acid, 1-[4'-(N-methyl-N-β-chloroethylsulfonyl-amino)]-benzoylamino-8-naphthol-3,6-disulfonic acid, 1-(3'-aminophenyl)-3-sulfomethyl-4-methyl-6-hydroxypyrid-2-one, 1-(4'-aminophenyl)-3-carboxamido-4-methyl-6-hydroxypyrid-2-one and 1-(β-aminoethyl)-3-cyano-4-methyl-6-hydroxypyrid-2-one.

Examples of starting compounds corresponding to the general formula (6), which can be used for preparing the copper complex monoazo compounds according to the invention, are 2,6-dichloro-4-methoxytriazine, 2,6-dichloro-4-methoxyethoxytriazine, 2,6-dichloro-4-ethoxytriazine, 2,6-dichloro-4-phenoxytriazine, 2,6-dichloro-4-(3'- or 4'-sulfophenyl)-hydroxtriazine, 2,6-dichloro-4-(4'-methylphenyl)-mercaptotriazine, 2,6-dichloro-4-ethylmercaptotriazine and 2,6-dichloro-4-phenylmercaptotriazine as well as primary condensation products of 2,4,6-trichloro-s-triazine with the following amino compounds corresponding to the general formula (8): ammonia, methylamine, dimethylamine, ethylamine, diethylamine, propylamine, isopropylamine, butylamine, dibutylamine, isobutylamine, sec. or tert.-butylamine, methoxyethylamine, hydroxyethylamine, dihydroxyethlamine, aminoethanesulfonic acid, N-methylaminoethanesulfonic acid, β-sulfatoethylamine, benzylamine, cyclohexylamine, aniline, m- and p-toluidine, 2,3-, 2,5-, 2,6- and 3,5-dimethylaniline, 3 and 4-chloroaniline, N-ethylaniline, 3- or 4-acetylaminoaniline, aniline-4-β-sulfatoethyl sulfone, aniline-4-vinyl sulfone, aniline-3-vinyl sulfone, 2-methoxyaniline-5-β-sulfatoethyl sulfone, 3- and 4-aminophenol, 2,5-dimethoxyaniline, aniline, m- and p-anisidine, m- and p-phenetidine, 2-methoxy-5-methylaniline, 2-ethoxy-5-methoxyaniline, 4-bromoaniline, 3-aminobenzamide, 4-aminophenylsulfamide, 3- and 4-aminophenylurea, 1-naphthylamine, 1-amino-4-hydroxynaphthalene, 1-amino-2-hydroxynaphthalene, aniline-3- or -4-sulfonic acid, aniline-2,4-disulfonic acid, aniline-2,5-disulfonic acid, aniline-3,5-disulfonic acid, 3- and 4-aminobenzoic acid, 4-aminophenylmethanesulfonic acid, aniline-N-methanesulfonic acid, 2-aminotoluene-4-sulfonic acid, 2-aminotoluene-5-sulfonic acid, 4-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, morpholine, piperidine and piperazine.

Among copper complex monoazo compounds according to the invention and of the general formula (1) those are to be mentioned as preferable which correspond to the general formula (16)

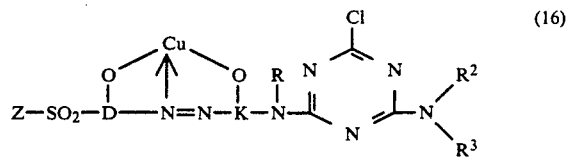

in which D, K, R, $R^2$, $R^3$ and Z have the abovementioned meanings, Z preferably denotine the β-sulfatoethyl group. In particular, in the formula (16) the formula radical D denotes the benzene nucleus which can be substituted by one or two substituents which belong to the group comprising lower alkyl, such as methyl and ethyl, lower alkoxy such as methoxy and ethoxy, carboxy, acetylamino, benzoylamino, sulfobenzoylamino, carbamoyl, carbamoyl which is monosubstituted or disubstituted by lower alkyl, benzyl and/or phenyl, sulfamoyl, sulfamoyl which is monosubstituted or disubstituted by lower alkyl, benzyl and/or phenyl, cyano, nitro, chlorine, bromine and sulfo, but, in particular, preferably to the group comprising sulfo, lower alkyl, such as, in particular, methyl, lower alkoxy, such as, in particular, methoxy, and chlorine. In particular, D, in the formula (16), is also a naphthalene nucleus which can be substituted by sulfo groups, preferably 1 or 2 sulfo groups. Further in the formula (16), the formula radical K denotes in particular the naphthalene nucleus, which can be substituted by 1 or 2 sulfonic acid groups, or the radical of pyrazol-4,5-ylene which has the azo group in the 5-position or, preferably, in the 4-position and which is substituted in the 3-position by methyl, carboxy, carbamoyl, lower carbalkoxy, such as carbomethoxy or carbethoxy, phenyl or sulfophenyl, and contains, bonded in the 1-position, a phenylene radical or naphthylene radical, it being possible for this phenylene to be substituted by 1 or 2 sulfonic acid groups and/or 1 or 2 substituents from the group comprising lower alkyl, lower alkoxy, chlorine, bromine, nitro, acetylamino and carboxy, and for this naphthylene to be substituted by 1, 2 or 3 sulfo groups and/or a substituent from the group comprising lower alkyl, lower alkoxy, nitro, acetylamino and carboxy, or K denotes a radical of the formula

in which the phenyl radical A can be substituted by 1 or 2 substituents from the group comprising lower alkyl, such as methyl or ethyl, lower alkoxy, such as methoxy or ethoxy, carboxy, acetylamino, benzoylamino, carbamoyl, carbamoyl which is monosubstituted or disubstituted by lower alkyl, benzyl and/or phenyl, sulfamoyl, sulfamoyl which is monosubstituted or disubstituted by lower alkyl, benzyl and/or phenyl, cyano, nitro, chlorine, bromine, trifluoromethyl and sulfo and the naphthyl radical B can be substituted by 1, 2 or 3 sulfo groups, —and the chlorotriazinylamino radical is bonded to one of the aromatic nuclei of K. Moreover in the formula (16), $R^2$ denotes in particular a hydrogen atom, a lower alkyl group, such as, preferably, the ethyl or, in particular, methyl group or a lower alkyl group which is substituted by hydroxy, sulfo or sulfato or lower alkoxy, such as, in particular, the β-hydroxyethyl or β-sulfoethyl group. Further in the formula (16), the formula radical $R^3$ preferably denotes a hydrogen atom, a lower alkyl group, such as, in particular, the methyl, ethyl or butyl group, a lower alkyl group which is substituted by hydroxy, sulfo, sulfato or lower alkoxy, such as, in particular, the γ-methoxypropyl, β-hydroxyethyl or β-sulfoethyl groups, the phenyl radical which can be substituted by substituents from the group comprising sulfo, methyl, methoxy, ethoxy, acetylamino, ureido, carboxy, carbamoyl, chlorine, sulfomethyl and sulfamoyl, or the naphthyl radical which can be substituted by 1, 2 or 3 sulfo groups.

Among the compounds according to the invention, of the general formula (1), also those are to be mentioned as also preferable which correspond to the general formulae (17) and (18)

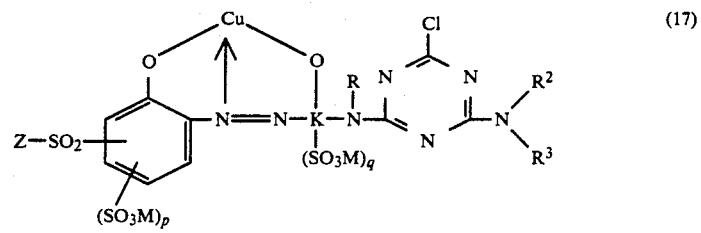

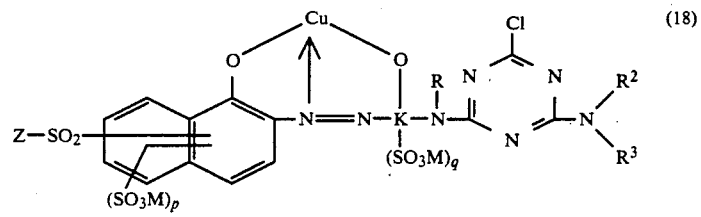

in which R and Z have the abovementioned meanings, R preferably represents a hydrogen atom or the methyl group and Z preferably is the β-sulfatoethyl group, K denotes the radical of a coupling component of the naphthalene or pyrazolone series which couples in the ortho-position relative to the phenolic or enolic hydroxy group, K preferably having the meanings indicated for the formula (16), p represents the number zero, 1 or 2 and q represents the number zero, preferably 1 or 2, the sum (p+q) being equal to the number 2, 3 or 4, $R^2$ denotes a hydrogen atom or the methyl or ethyl group and $R^3$ denotes a hydrogen atom, the β-sulfoethyl group or the phenyl radical which can be substituted by substituents of the group comprising sulfo, methyl, methoxy, acetylamino, carboxy, chlorine and sulfamoyl, or the naphthyl radical which can be substituted by 1, 2 or 3 sulfo groups, and M represents a hydrogen atom or one equivalent of a monovalent, divalent or trivalent metal, in particular of an alkali metal or alkaline earth metal, such as of sodium, potassium or calcium.

Of these compounds according to the invention, the copper complex phenylazonaphthyl, naphthylazonaphthyl, phenylazopyrazolyl and naphthylazopyrazolyl compounds according to the invention and corresponding to the general formulae (19), (20) and (21)

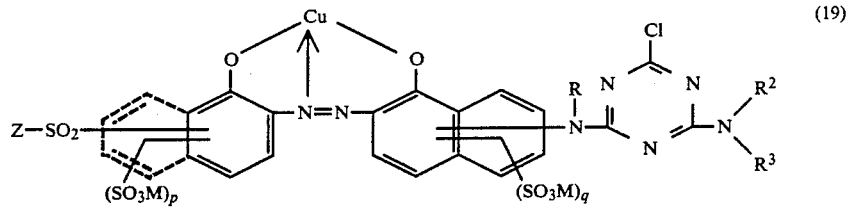

(19)

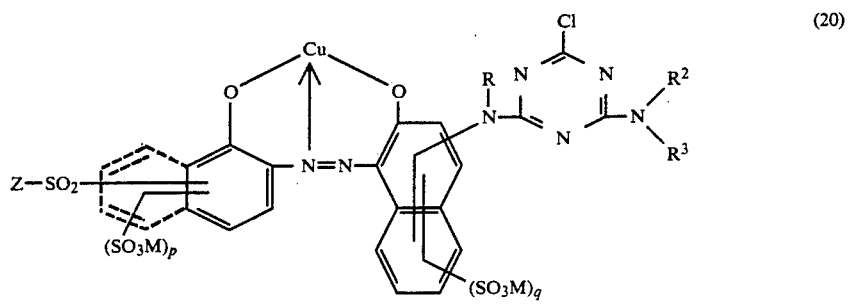

(20)

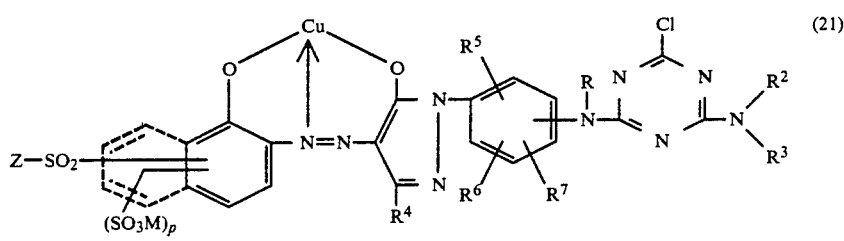

(21)

are to be emphasized and in which the radical of a benzene nucleus, drawn with a broken line, denotes, together with the benzene nucleus bonded to it, the corresponding naphthalene radical and in which M, R, $R^2$, $R^3$ and Z have the abovementioned, in particular preferable, meanings and p represents the number zero or 1 and q represents the number 1 or 2, the sum (p+q) being equal to 2 or 3, and in which $R^4$ denotes a methyl, carboxylic acid, lower carbalkoxy or carboxamide group, $R^5$ denotes a hydrogen atom, the sulfonic acid group, an alkyl group of 1 to 4 C atoms, preferably the ethyl group or, in particular the methyl group, or a chlorine atom, $R^6$ is a hydrogen atom, an alkyl group of 1 to 4 C atoms, such as the ethyl group or, in particular, the methyl group, or a chlorine atom and $R^7$ represents a hydrogen atom, an alkyl group of 1 to 4 C atoms, such as the ethyl group or, in particular, the methyl group, or the sulfonic acid group, it being possible for $R^5$, $R^6$ and $R^7$ to have meanings which are identical to or different from one another.

Compounds according to the invention, of the general formula (1), can be isolated from their synthesis solutions by generally known methods, thus, for example, by precipitation from the reaction medium by means of electrolytes, for example sodium chloride or potassium chloride, or by evaporation of the reaction solution, for example by spray drying, it being possible for a buffer substance, such as, for example, a mixture of monosodium phosphate and disodium phosphate, to be added to this reaction solution.

The new compounds according to the invention, of the formula (1), have fiber-reactive properties and very good dyestuff properties. They can be used for dyeing material containing hydroxy and/or carbonamide groups, in particular fiber material, and for leather. The solutions of compounds according to the invention obtained in the synthesis, if appropriate after addition of a buffer substance and, if necessary, after concentrating, can be used for dyeing directly as a liquid composition.

The present invention therefore relates to the use of compounds according to the invention, of the formula (1), for dyeing materials containing hydroxy and/or carbonamide groups and to a process for their application to these substrates. This includes mass coloration, for example of polyamide sheeting, and printing. The materials are preferably used in the form of fiber materials, in particular in the form of textile fibers, such as yarns, wound entities and fabrics.

Materials containing hydroxy groups are natural or synthetic materials containing hydroxy groups, such as, for example, cellulose fiber materials or their regenerated product or polyvinyl alcohols. Cellulose fiber materials preferably are cotton but also other vegetable fibers, such as linen, hemp, jute or ramie fibers; examples of regenerated cellulose fibers are viscose staple and viscose rayon.

Examples of materials containing carbonamide groups are synthetic and natural polyamides and polyurethanes, in particular in the form of fibers, for example wool and other animal hairs, silk, leather, polyamide 6,6, polyamide 6, polyamide 11 and polyamide 4.

The new copper complex monoazo compounds of the formula (1) can be applied to and fixed on the substrates mentioned, in particular on the fiber materials mentioned, by the application techniques known for water-soluble dyestuffs, in particular for fiber-reactive dyestuffs. Thus, they produce on cellulose fibers, by the exhaust method using a wide variety of acid-binding agents and, if appropriate, with the addition of neutral salts, such as sodium chloride or sodium sulfate, very good dye yields and excellent build-up of color. Dyeing is carried out at temperatures between 40° and 105° C., if appropriate at temperatures up to 120° C. under pressure, and if appropriate in the presence of customary dyeing auxiliaries, in an aqueous bath. One possible procedure is to introduce the material into the warm bath and gradually heating the latter to the dyeing temperature desired and completing the dyeing process at this temperature. It is also possible, if desired, to add the neutral salts, which accelerate the exhaustion of the dyestuff, to the bath after the actual dyeing temperature has been reached.

The pad process also produces excellent color yields and a very good build-up of color on cellulose fibers, in which fixation can be carried out by leaving the padded material to stand at room temperature or at an elevated temperature, for example up to about 60° C., by steaming or by means of dry heat in a customary manner.

Customary printing processes for cellulose fibers, which can be carried out in one step, for example in the presence of sodium bicarbonate or of another acid-binding agent in the print paste and by subsequent steaming at 100° to 103° C., or in two steps, for example by printing with a neutral or slightly acidic print paste and fixation either by passing through a hot electrolyte-containing alkaline bath or by overpadding with an alkaline electrolyte-containing pad liquor with subsequent leaving this over-padded material to stand or subsequent steaming or subsequent treatment with dry heat, also produce deep prints having well-delineated contours and a clear white ground. The outcome of the prints depends only to a small extent on varying conditions of fixing.

When fixing by means of dry heat in customary thermofixing processes, hot air at 120° to 200° C. is used. In addition to customary steam of 101° to 103° C., it is also possible to use superheated steam or saturated steam of temperatures up to 160° C.

Examples of acid-binding agents and of agents effecting the fixation of the dyestuffs on the cellulose fibers are water-soluble basic salts of alkali metals and also of alkaline earth metals of inorganic or organic acids or compounds which liberate alkali on heating. The alkali metal hydroxides and alkali metal salts of weak to medium strong inorganic or organic acids are to be mentioned in particular, the sodium and potassium compounds being preferably understood among the alkali metal compounds. Examples of these acid-binding agents are sodium hydroxide, potassium hydroxide, sodium carbonate, sodium bicarbonate, potassium carbonate, sodium formate, sodium dihydrogenphosphate, disodium hydrogenphosphate, sodium trichloroacetate, water glass and trisodium phosphate.

The presence of two reactive centers in the copper complex monoazo compounds of the general formula (1), which can be used as fiber-reactive dyestuffs, leads to remarkably high fixing rates on cellulose fibers. Reactive dyestuffs having a very high fixing rate are very useful in practice, for economic, energy-related and ecological reasons, since better exploitation of the dyestuff offered equates with energy-saving, more ready rinsibility of the reduced, non-fixed dyestuff fraction and reduced effluent burden.

The dyeings and prints produced with the copper complex monoazo compounds of the general formula (1) are distinguished by clear hues. In particular the dyeings and the prints on cellulose fiber materials have a high depth, as already mentioned, and in addition good to very good light fastness and very good wet fastness properties, such as wash, fulling, water, seawater and perspiration fastness properties, and also good fastness to pleating, ironing and rubbing.

The examples which follow serve to illustrate the invention. The parts are parts by weight and the percentages are percentages by weight, unless otherwise indicated. Parts by weight relate to parts by volume as the kilogram relates to the liter.

EXAMPLE 1

A solution of 64.5 parts of the compound of the formula

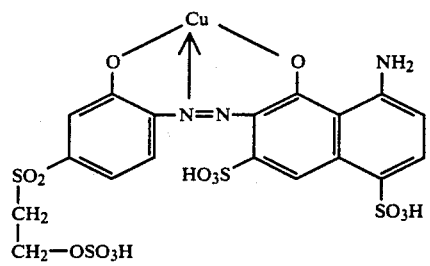

in the form of the sodium salt in 450 parts of water are allowed to flow with thorough stirring into a mixture of 50 parts of ice, 10 parts of water and 19.4 parts of 2,4,6-trichloro-s-triazine, a pH value between 6.0 and 6.8 being maintained by means of sodium carbonate. The mixture is then stirred for a further 30 minutes at a temperature below 20° C., and 17.3 parts of aniline-3-sulfonic acid are then added. The pH value of the second condensation reaction is also maintained between 6.0 and 6.8 by means of sodium carbonate. The deep violet solution is then mixed with an aqueous disodium phosphate solution and spray-dried. A dark electrolyte-containing powder is obtained which contains the sodium salt of the compound of the formula (A)

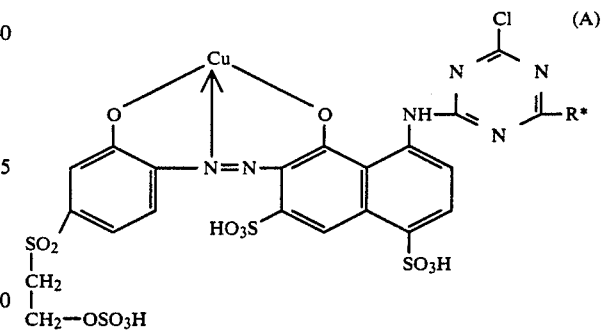

in which R* denotes the m-sulfophenylamino radical. This compound displays very good dyestuff properties and dyes, by the application and fixing methods known in industry for acid, water-soluble dyestuffs, in particular for fiber-reactive dyestuffs, the fiber materials mentioned in the descriptive section, in particular cellulose fiber materials, such as cotton, in intense violet shades having good to very good fastness properties, of which the very good light fastness and the very good wash fastness values are to be mentioned in particular. The dyestuff also has on cellulose fiber materials, by the application and fixing methods for fiber-reactive dyestuffs customary in industry, remarkably high fixing rates; non-fixed fractions of the dyestuff can be readily washed out.

EXAMPLES 2 to 17

In the tabled examples which follow, further copper complex monoazo compounds according to the invention are described with the aid of the formula radical R* of the general formula (A) shown in Example 1. These compounds can be prepared in the manner described in Example 1, but, in the second condensation step, aniline-3-sulfonic acid is replaced by an equivalent amount of another aromatic amine which corresponds to the general formula (8) and is described in the corresponding tabled example. These compounds according to the invention are accordingly obtained in the form of their sodium salts. These copper complex monoazo compounds according to the invention also display very good fiber-reactive dyestuff properties and produce, on the fiber materials mentioned in the descriptive section, in particular on cellulose fiber materials, by the application and fixing methods customary in industry, deep, always violet dyeings and prints having good fastness properties, which are comparable to those obtainable with the copper complex monoazo compound, according to the invention, described in Example 1.

| Examples | Amine of the formula (8) | Compound of the formula (A), in which R* is: |
|---|---|---|
| 2 | N-Methylaniline | 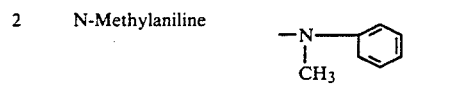 |
| 3 | 3,5-Dimethylaniline | 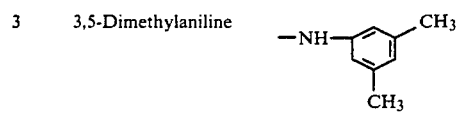 |
| 4 | 4-Methoxyaniline | 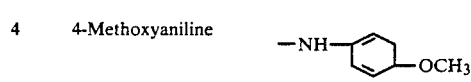 |
| 5 | Aniline-4-sulfonic acid | 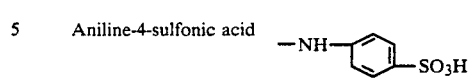 |
| 6 | 4-Aminobenzoic acid | 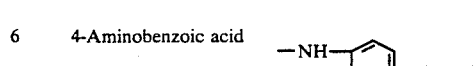 |
| 7 | 3-Methylaniline |  |
| 8 | 2-Methoxy-5-methyl-aniline | 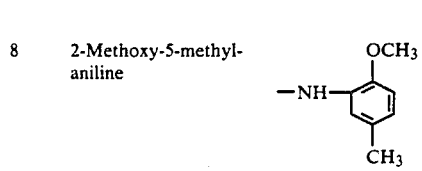 |
| 9 | ω-Aminobenzyl-4-sulfonic acid |  |
| 10 | Aniline | 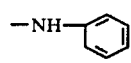 |
| 11 | 3-Acetylaminoaniline | 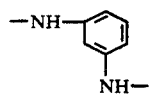 |
| 12 | N-(4-Aminophenyl)-urea | 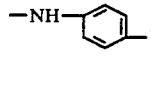 |
| 13 | 3-(β-Sulfatoethylsulfonyl)-aniline | 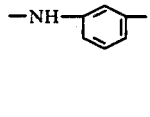 |
| 14 | 3-Vinylsulfonylaniline | 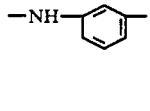 |
| 15 | 4-(β-Sulfatoethylsulfonyl)-aniline | 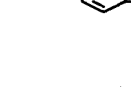 |
| 16 | 2-Amino-naphthalene-6-sulfonic acid | 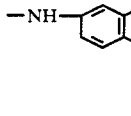 |
| 17 | 2-Amino-naphthalene-4,8-disulfonic acid | 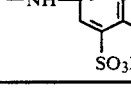 |

EXAMPLE 18

The aqueous solution, described at the start of Example 1, of the sodium salt of 64.5 parts of the copper complex monoazo compound in 450 parts of water is allowed to flow into a suspension of 24.2 parts of 2,6-dichloro-4-phenoxy-s-triazine in 60 parts of water. The mixture is stirred for a further 2 hours at 30° C.; a pH value between 6.5 and 7.0 is maintained by means of sodium carbonate. The resulting copper complex monoazo compound according to the invention is salted out by means of potassium chloride and filtered off; the moist filter cake is mixed with an aqueous disodium phosphate solution and dried. After milling, an electrolyte-containing dyestuff powder which contains an alkali metal salt, predominantly the potassium salt, of the compound of the formula

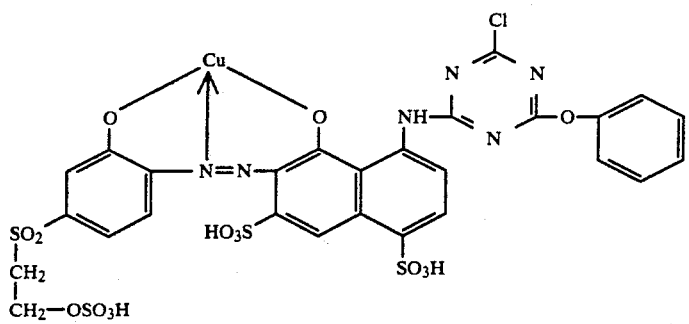

is obtained. This compound has very good fiber-reactive dyestuff properties and produces, for example by the application and fixing methods customary in the printing industry, on fiber materials mentioned in the descriptive section, in particular on cellulose fiber materials, in the presence of alkalis, such as, for example, sodium bicarbonate, deep violet prints having very good fastness properties, such as, in particular, good to very good light fastness, wash fastness and chlorinated water fastness properties.

EXAMPLES 19 to 29

To prepare a copper complex monoazo compound according to the invention and corresponding to the above general formula (A) in which the formula radical R* represents the radical the formula of which is indicated in the particular tabled example is obtained. These compounds, according to the invention, and of Examples 19 to 29, which are isolated as alkali metal salts from the reaction batch, also have very good fiber-reactive dyestuff properties and produce, in particular on cellulose fiber materials, such as cotton, by the application and fixing methods customary in industry deep violet dyeings having good fastness properties which are similar to those of the compound, according to the invention, of Example 18.

| Example | Dichlorotriazinyl compound corresponding to the general formula (6) | Compound of the formula (A) in which R* is: |
|---|---|---|
| 19 | 2,6-Dichloro-4-methoxy-s-triazine | —OCH$_3$ |
| 20 | 2,6-Dichloro-4-(methoxyethoxy)-s-triazine | —O—CH$_2$—CH$_2$—OCH$_3$ |
| 21 | 2,6-Dichloro-4-ethylmercapto-s-triazine | —S—CH$_2$—CH$_3$ |
| 22 | 2,6-Dichloro-4-phenylmercapto-s-triazine | —S—C$_6$H$_5$ |
| 23 | 2,6-Dichloro-4-amino-s-triazine | —NH$_2$ |
| 24 | 2,6-Dichloro-4-ethylamino-s-triazine | —NH—C$_2$H$_5$ |
| 25 | 2,6-Dichloro-4-(methoxyethyl)-amino-s-triazine | —NH—CH$_2$—CH$_2$—OCH$_3$ |
| 26 | 2,6-Dichloro-4-cyclohexylamino-s-triazine | —NH—C$_6$H$_{11}$ |
| 27 | 2,6-Dichloro-4-($\beta$-sulfoethyl)-amino-s-triazine | —NH—CH$_2$—CH$_2$—SO$_3$H |
| 28 | 2,6-Dichloro-4-(N-methyl-N-$\beta$-sulfoethyl)-amino-s-triazine | —N(CH$_3$)—CH$_2$—CH$_2$—SO$_3$H |
| 29 | 2,6-Dichloro-4-morpholino-s-triazine | —N(morpholino) | according to the invention and corresponding to the general formula (1) the procedure indicated in Example 18 is followed, but instead of the dichlorophenoxytriazine compound indicated there an equivalent amount of one of the dichlorotriazine compounds listed below in tabled Examples 19 to 29 is used. In this manner, a copper complex compound according to the invention

EXAMPLE 30

25 parts of copper sulfate are added with thorough stirring at a temperature of 35° C. to an aqueous solution, having a pH value of 7, of the sodium salt of 83.2 parts of the compound of the formula

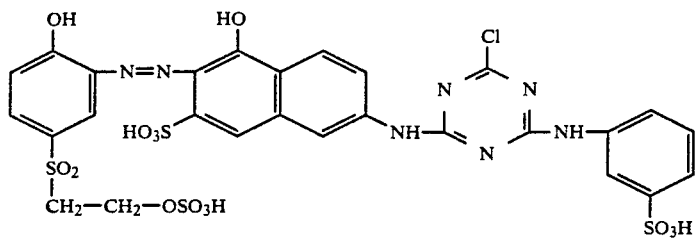

(which can be prepared by coupling diazotized 3-amino-4-hydroxyphenyl-β-sulfatoethyl sulfone with the secondary condensation product of 2,4,6-trichlorotriazine, aniline-3-sulfonic acid and 2-amino-5-hydroxynaphthalene-7-sulfonic acid) in 495 parts of water; the reaction batch is stirred for two hours at a pH value of 4.5 to 5.0. The resulting copper complex monoazo compound according to the invention is salted out of the reaction batch by means of potassium chloride, filtered off and dried at 60° C. The electrolyte-containing powder obtained after milling contains an alkali metal salt, predominantly the potassium salt, of the compound of the formula

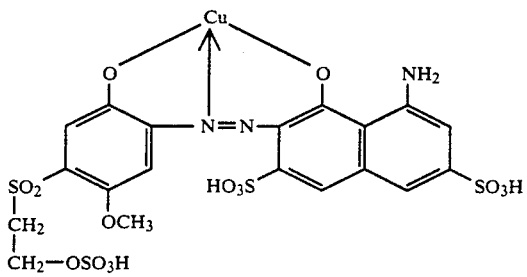

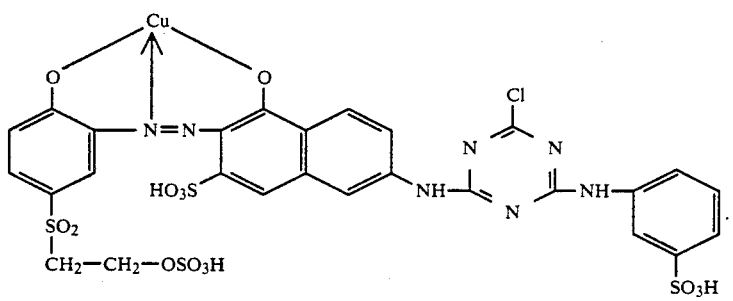

This compound according to the invention has very good fiber-reactive dyestuff properties and produces, for example on cellulose fiber materials, by the application and fixing methods customary in industry for fiber-reactive dyestuffs in the presence of an acid-binding agent deep, purplish red dyeings and prints which have very good wash and light fastness properties.

EXAMPLE 31

A solution of the sodium salt of 71.9 parts of the copper complex monoazo compound of the formula (which can be prepared by coupling 4-amino-2,5-dimethoxyphenyl-β-sulfatoethyl sulfone with 1-acetylamino-8-hydroxynaphthalene-3,6-disulfonic acid, dealkylating coppering, hydrolysis of the acetylamino group to the amino group and subsequent esterification of the resulting β-hydroxyethyl sulfone group) in 635 parts of water is allowed to flow with thorough stirring into a mixture of 50 parts of water, 10 parts of crushed ice and 19.4 parts of 2,4,6-trichloro-s-triazine, a pH value between 6.0 and 6.8 being maintained by means of sodium carbonate. After a further stirring for 30 minutes at a temperature below 20° C., 17.3 parts of aniline-3-sulfonic acid are added, a pH value between 6.0 and 6.8 again being maintained by means of sodium bicarbonate also in this second condesation reaction. After the reaction is complete, the batch is subjected to spray drying. An electrolyte-containing, blackish blue powder is obtained which readily gives a blue solution in water. It contains the sodium salt of the compound of the formula

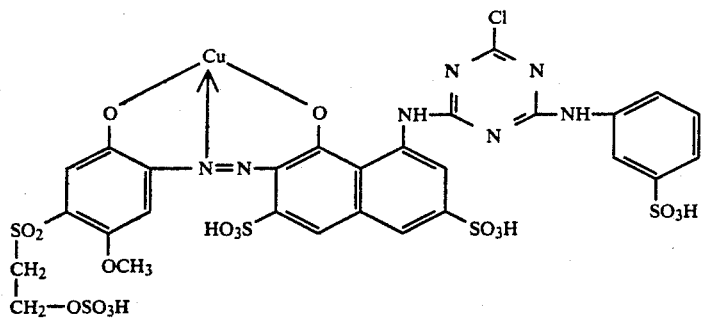

which has very good fiber-reactive dyestuff properties and dyes, for example, cotton in the exhaust method in deep, blue shades having very good light and wash fastness properties.

EXAMPLE 32

75.9 parts of 1-($\beta$-sulfatoethylsulfonyl)-7-aminonaphthalene-3-sulfonic acid are stirred into 400 parts of water and 200 parts of ice and diazotized at 5° to 10° C. by means of an aqueous sodium nitrite solution. The resulting diazo suspension is allowed to flow into a solution of 118 parts of the secondary condensation product of 1-amino-8-hydroxynaphthalene-3,6-disulfonic acid, 2,4,6-trichloro-s-triazine and aniline-3-sulfonic acid in 800 parts of water, the pH value being maintained between 5.5 and 6.5 by means of sodium carbonate. After the coupling reaction is complete, 50 parts of crystalline copper sulfate and then, in the course of about 4 hours at a temperature of 20° to 25° C. and at a pH value of 4.5 to 5.0, 500 parts by volume of a 14% strength aqueous hydrogen peroxide solution are added. After the oxidative coppering reaction is complete, the resulting compound according to the invention is salted out by means of potassium chloride, and filtered off, and the filter residue is washed with an aqueous potassium chloride solution and then dried at 60° C. under reduced pressure. A blackish blue, electrolyte-containing powder which contains an alkali metal salt, predominantly the potassium salt, of the compound of the formula is obtained. This compound according to the invention has very good fiber-reactive dyestuff properties and produces, for example on viscose staple, by one of the short time pad batch methods customary in industry deep blue dyeings having very good wash and light fastness properties.

EXAMPLES 33 to 54

In the tabled examples below, further copper complex azo compounds according to the invention and corresponding to the general formula (1) are described which have very good fiber-reactive dyestuff properties and also produce on the fiber materials mentioned in the descriptive section, such as, in particular, on cellulose fiber materials, preferably cotton, by the application and fixing methods customary in industry light- and wet-fast dyeings and prints which have the hues indicated in the particular tabled example. These copper complex azo compounds according to the invention are characterized in the tabled examples by their components (diazo components, coupling components and amino substituents present in the 4-position of the triazine radical). They can be prepared by using the corresponding components evident from the tabled examples, or their precursors, in the manner according to the invention, for example in a procedure indicated in the above illustrative embodiments; the substituent indicated with X in the chlorotriazine radical corresponds to the amino radical of the amine corresponding to the general formula (8).

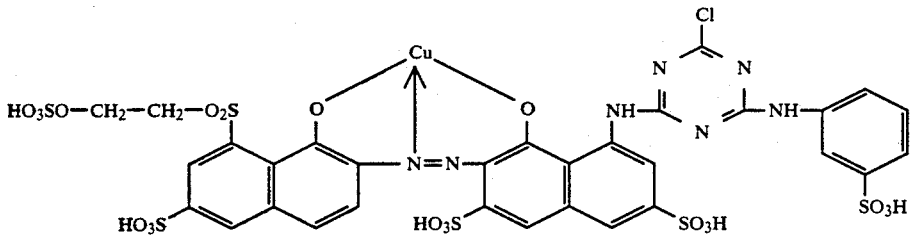

| Example | Diazo component | Coupling component | Radical X of amine (8) in diazo or coupling components | Hue on cotton |
| --- | --- | --- | --- | --- |
| 33 | 4-Amino-5-hydroxyphenylvinyl sulfone | 1-(6'-Chloro-4'-X-triazinylamino)-8-hydroxynaphthalene-4,6-disulfonic acid | 3-Sulfoanilino | violet |
| 34 | 4-Aminophenyl-$\beta$-acetoxyethyl sulfone | 1-(6'-Chloro-4'-X-triazinylamino)-8-hydroxynaphthalene-4,6-disulfonic acid | 3-Carboxyanilino | violet |
| 35 | 4-Amino-5-hydroxyphenyl-$\beta$-thiosulfatoethyl sulfone | 1-(6'-Chloro-4'-X-triazinylamino)-8-hydroxynaphthalene-3,6-disulfonic acid | Amino | violet |
| 36 | 3-Aminophenyl-$\beta$-chloroethyl | 2-(6'-Chloro-4'-X-triazinylamino)- | 3-Sulfoanilino | purplish |

-continued

| Example | Diazo component | Coupling component | Radical X of amine (8) in diazo or coupling components | Hue on cotton |
|---|---|---|---|---|
| | sulfone | 5-hydroxynaphthalene-1,7-disulfonic acid | | red |
| 37 | 3-Amino-4-hydroxyphenyl-β-sulfatoethyl sulfone | 2-(6′-Chloro-4′-X-triazinylamino)-8-hydroxynaphthalene-1,6-sulfonic acid | 3-Sulfoanilino | purplish red |
| 38 | 3-Amino-4-hydroxyphenyl-β-sulfatoethyl sulfone | 1-(6′-Chloro-4′-X-triazinylamino)-8-hydroxynaphthalene-3,6-disulfonic acid | Phenoxy | violet |
| 39 | 3-Amino-4-hydroxyphenyl-β-sulfatoethyl sulfone | 2-(6′-Chloro-4′-X-triazinylamino)-5-hydroxynaphthalene-7-sulfonic acid | β-Sulfoethylmethyl-amino | purplish red |
| 40 | 3-Amino-6-methoxyphenyl-β-sulfatoethyl sulfone | 1-(6′-Chloro-4′-X-triazinylamino)-8-hydroxynaphthalene-4,6-disulfonic acid | 3-Sulfoanilino | violet |
| 41 | 7-Aminonaphth-1-yl-β-sulfatoethyl sulfone | 1-(6′-Chloro-4′-X-triazinylamino)-8-hydroxynaphthalene-4,6-disulfonic acid | β-Sulfoethylamino | blue |
| 42 | 7-Amino-3-sulfonaphth-1-yl-β-sulfatoethyl sulfone | 2-(6′-Chloro-4′-X-triazinylamino)-5-hydroxynaphthalene-7-sulfonic acid | 3-Sulfoanilino | violet |
| 43 | 7-Amino-3-sulfonaphth-1-yl-β-sulfatoethyl sulfone | 1-(6′-Chloro-4′-X-triazinylamino)-8-hydroxynaphthalene-3,6-disulfonic acid | 4-Aminophenyl-β-sulfatoethyl sulfone | blue |
| 44 | 3-Amino-4-hydroxyphenyl-β-sulfatoethyl sulfone | 1-(6′-Chloro-4′-X-triazinylamino)-8-hydroxynaphthalene-3,6-disulfonic acid | 4-Aminophenyl-β-sulfatoethyl sulfone | violet |
| 45 | 4-Aminonaphth-1-yl-β-sulfatoethyl sulfone | 1-(6′-Chloro-4′-X-triazinylamino)-8-hydroxynaphthalene-3,6-disulfonic acid | 3-Sulfoaniline | blue |
| 46 | 4-Amino-6-sulfonaphth-1-yl-β-sulfatoethyl sulfone | 1-(6′-Chloro-4′-X-triazinylamino)-8-hydroxynaphthalene-4,6-disulfonic acid | β-Sulfoethylamine | blue |
| 47 | 5-Amino-8-sulfonaphth-2-yl-β-sulfatoethylsulfone | 1-(6′-Chloro-4′-X-triazinylamino)-8-hydroxynaphthalene-3,6-disulfonic acid | N-ethylanilino | blue |
| 48 | 2-Amino-6-(6-chloro-4′-X-triazinylamino)-naphthalene-4,8-disulfonic acid | 4-Hydroxynaphth-1-yl-β-sulfatoethyl sulfone | 1-Naphthylamino-3,6-disulfonic acid | violet |
| 49 | 2-Amino-6-(6′-chloro-4′-X-triazinylamino)-naphthalene-4,8-disulfonic acid | 6-Hydroxynaphth-1-yl-β-sulfatoethyl sulfone | 3-Sulfoanilino | violet |
| 50 | 4-(6′-Chloro-4′-X-triazinyl-amino)-2-aminophenol-6-sulfonic acid | 2-N-Methyl-N-ethionylamino-8-hydroxynaphthalene-6-sulfonic acid | 3-Sulfoanilino | violet |
| 51 | 6-(6′-Chloro-4′-X-triazinyl-amino)-2-aminophenol-4-sulfonic acid | 1-(4′-β-Sulfatoethylsulfonyl-phenyl)-3-carboxypyrazol-5-one | 3-Sulfoanilino | reddish brown |
| 52 | 6-(6′-Chloro-4′-X-triazinyl-amino)-2-aminophenol-4-sulfonic acid | 1-(4′-β-Sulfatoethylsulfonyl-2′-sulfophenyl)-3-carbethoxypyrazol-5-one | 4-Sulfoanilino | reddish brown |
| 53 | 3-Amino-4-hydroxyphenyl-β-sulfatoethyl sulfone | 1-[2′-Sulfo-4′-(6″-chloro-4″-X-triazinylamino)-phenyl]-3-carboxy-pyrazol-5-one | 3-Sulfoanilino | yellowish brown |
| 54 | 3-Amino-4-hydroxyphenyl-β-sulfatoethyl sulfone | 1-[2′-Methyl-3′-sulfo-5′-(6″-chloro-4″-X-triazinylamino)-phenyl]-3-carboxypyrazol-5-one | 3-Sulfoanilino | yellowish brown |
| 55 | 3-Amino-4-hydroxy-5-sulfo-phenyl-β-sulfatoethyl sulfone | 1-(6′-Chloro-4′-X-triazinyl-amino)-3-carboxamido-4-methyl-6-hydroxypyrid-2-one | β-Sulfoethylamine | yellowish brown |
| 56 | 3-Amino-4-hydroxy-5-sulfo-phenyl-β-sulfatoethyl sulfone | 1-(6′-Chloro-4′-X-triazinyl-amino)-7-hydroxynaphthalene-3-sulfonic acid | 3-Sulfoaniline | violet |

I claim:
1. A copper-complex phenylazonaphthyl or naphthylazonaphthyl compound of the formula

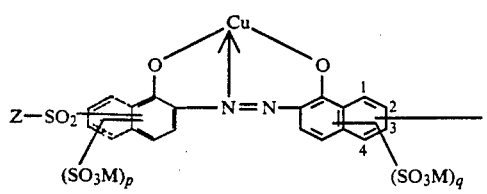

-continued

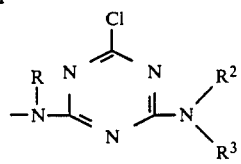

in which:
the group of the formula p is zero or 1,
q is 2, and
M is hydrogen or an alkali metal.

2. A copper-complex compound according to claim 1, of the formula

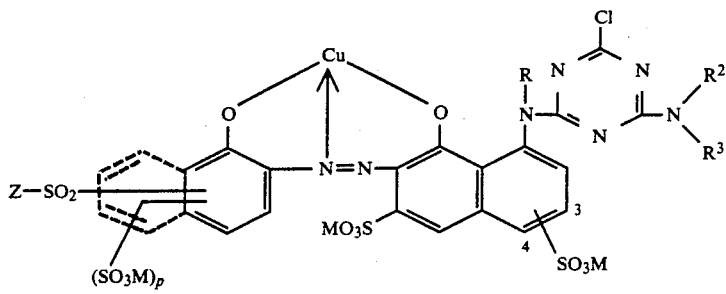

in which the one group —SO$_3$M is bonded to the naphthalene moiety in the 3- or 4-position and M, Z, p, R, R$^2$ and R$^3$ are defined as in claim 16.

3. A compound according to claim 1 of the formula

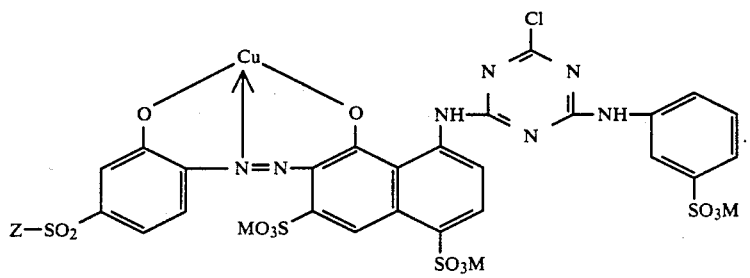

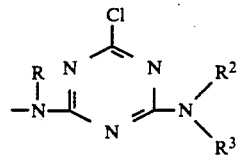

is bonded to the naphthalene moiety in the 1-position, the radical of the benzene ring, drawn with a broken line, together with the benzene ring bonded to it, represents the corresponding naphthalene ring, Z is vinyl, β-acetoxyethyl, β-thiosulfatoethyl, β-chloroethyl or β-sulfatoethyl, R is hydrogen or alkyl of 1 to 4 C-atoms, R$^2$ is hydrogen, R$^3$ is phenyl substituted by sulfo or β-sulfato ethylsulfonyl, 4. A compound according to claim 1, wherein Z is β-sulfatoethyl or vinyl.

5. A compound according to claim 1, in which Z is β-sulfatoethyl or vinyl.

6. A compound according to claim 1, in which M is hydrogen, sodium or potassium.

7. A compound as claimed in claim 1 of the formula

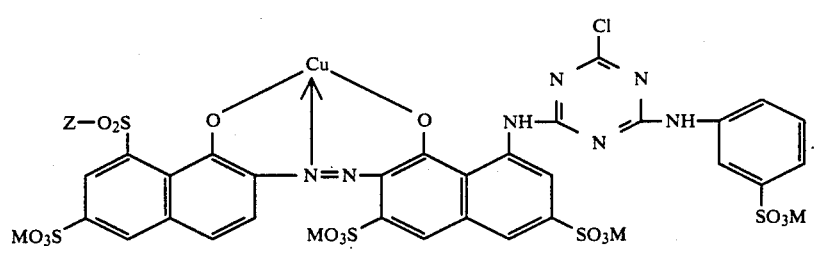

8. A compound as claimed in claim 1 of the formula

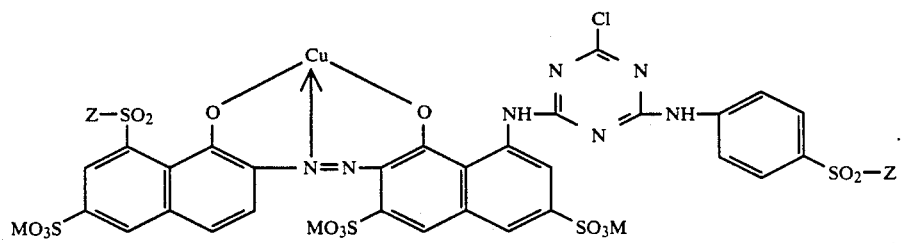

* * * * *